Feb. 25, 1964 R. J. WOOLACOTT 3,122,637
SETTING OUT OF CONCRETE STRUCTURES BY MEANS
OF RADIOACTIVE SOURCE AND DETECTOR
Filed July 30, 1959 2 Sheets-Sheet 2
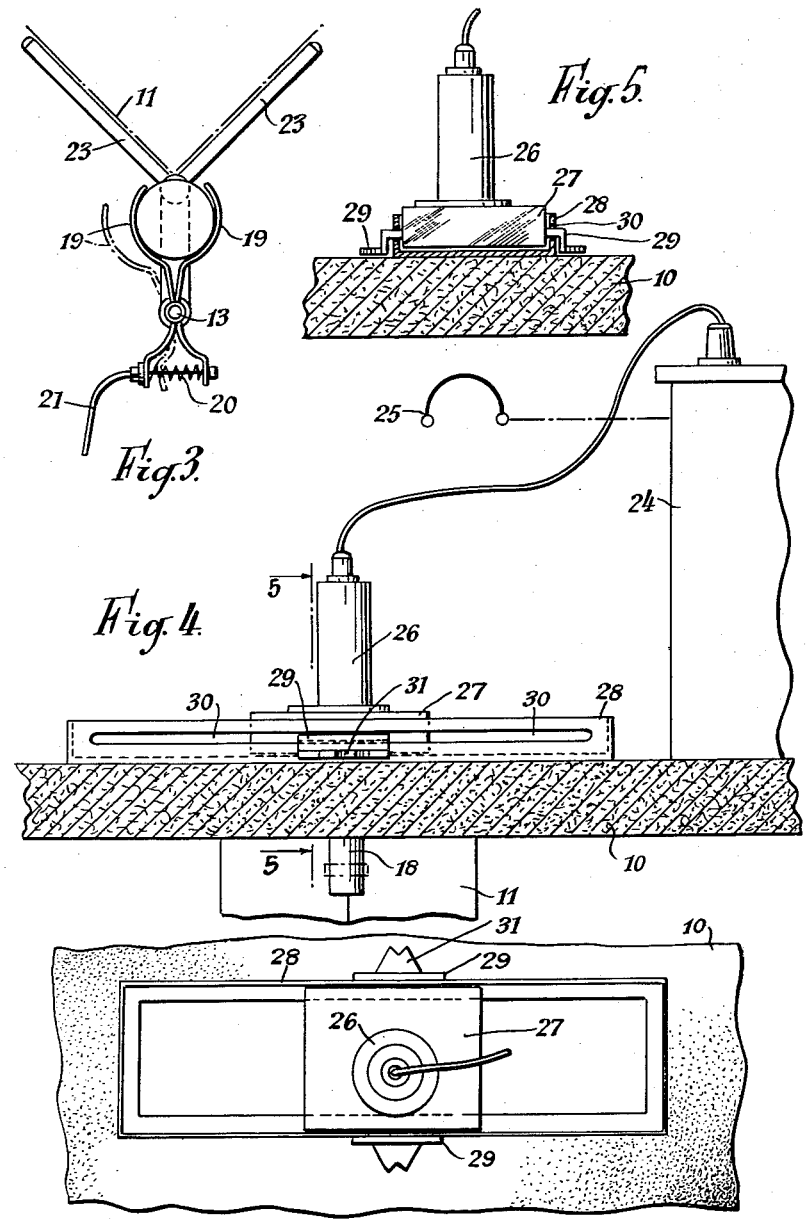
INVENTOR
REGINALD JAMES WOOLACOTT
BY
Dean Fairbank & Hirsch
ATTORNEYS Patented Feb. 25, 1964

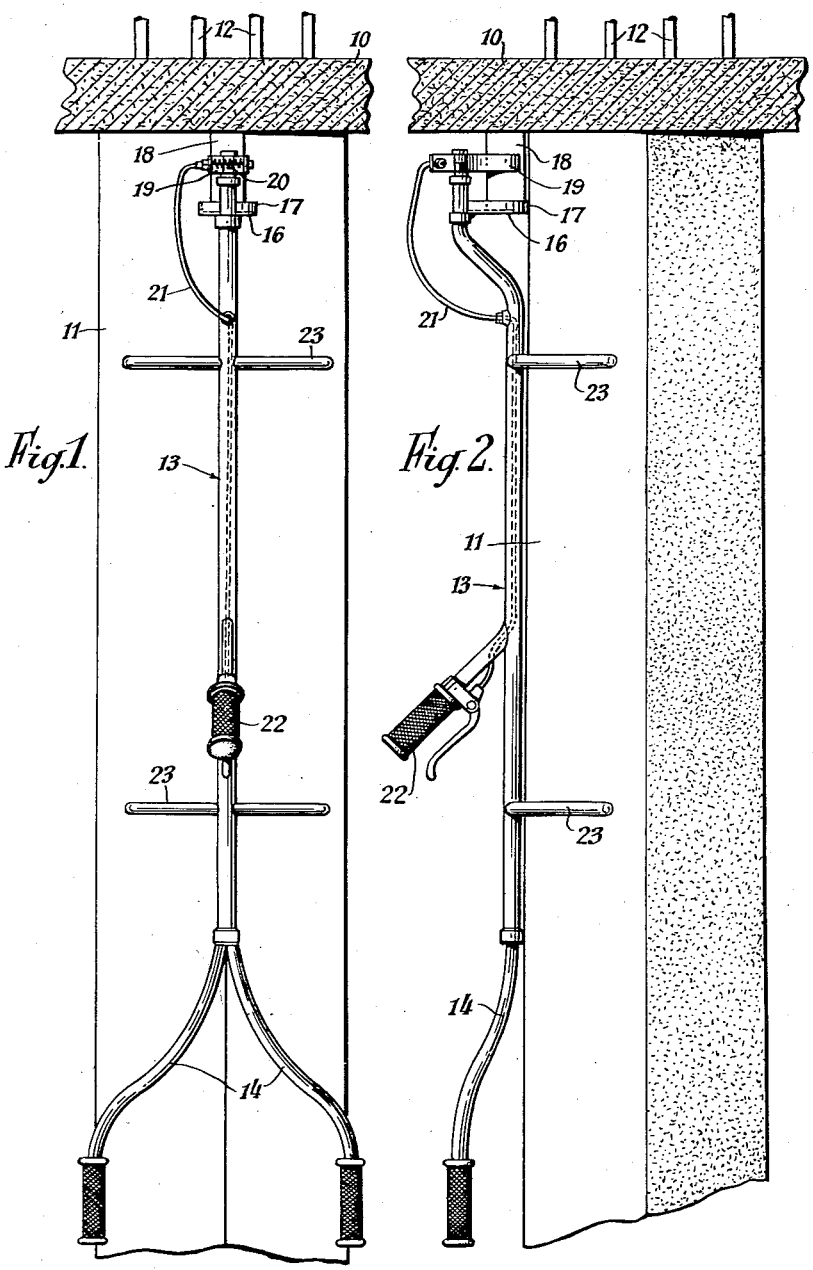

3,122,637
SETTING OUT OF CONCRETE STRUCTURES BY MEANS OF RADIOACTIVE SOURCE AND DETECTOR
Reginald James Woolacott, London, England, assignor to Percy Bilton Limited, London, England
Filed July 30, 1959, Ser. No. 830,521
2 Claims. (Cl. 250—83)

This invention relates to a method and means for the accurate positioning of building structures and in particular to a method and apparatus for the setting out of concrete and like structures. In the erection of a multi-stored building, the positioning of the columns of each floor is of vital importance as the columns generally must be accurately positioned one above the other. Each storey consists of a number of upright columns across which the floor structure of the next storey is cast. Prior to the present invention it has been difficult to accurately position the shuttering for the columns on the floor of the next storey as due to the floor structure the position has had to be marked out manually from the edge of the floor which was not only time consuming but sometimes difficult and inaccurate.

The present invention provides an improved method and apparatus for solving the above difficulty, primarily by using the gamma rays emitted from a radio-active isotope, the radio-active substance being located against the top of the lower column of other structure, whereby the rays penetrate the next upper flood and are received by a suitable apparatus which indicates on the surface of the floor the exact positioning for setting out the shuttering for the next upper column.

According to the invention there is provided a method of locating a desired position on one side of a building structure, such as a wall or floor corresponding to a predetermined position on the other side of the structure, which method comprises the steps of locating a radio-active substance at the said predetermined position whereby the radio-active rays emitted therefrom penetrate the building structure, and receiving the said rays by a detection apparatus located on said one side of the structure to indicate said desired position.

Preferably a radio-active istotope, such as caesium or cobalt is used and the gamma rays emitted therefrom are received by a detection apparatus such as a scintillation counter, the probe of which is movable to indicate the desired position when the maximum or peak point is obtained.

According to a further aspect of the invention there is provided an apparatus which utilizes the above method for locating a column in position above the next lower column of a multi-storied building, which apparatus comprises an elongated member having means at one end thereof for holding said radio-active substance, a handle at the other end thereof for operating said member to position the radio-active substance against said next lower column, and means intermediate said ends for engaging the surface of said column. Preferably remote control means is provided intermediate the ends of the elongated member for releasing the radio-active substance from the holding means.

The apparatus furthermore includes a detection apparatus, the probe of which is mounted in a movable slide in an elongated frame.

In order that the invention may be clearly understood the preferred method and apparatus will now be described by way of example with reference to the accompanying drawings, in which:

FIGURE 1 is a front elevation of an apparatus for holding a radio-active source in position below a floor structure against a lower column;

FIGURE 2 is a side elevation of the apparatus of FIGURE 1;

FIGURE 3 is a plan view of the apparatus of FIGURE 1;

FIGURE 4 is a side view of a detection apparatus in position on the floor structure above the radio-active source;

FIGURE 5 is a sectional view on the line 5—5 of FIGURE 4; and

FIGURE 6 is a plan view of part of the detection apparatus of FIGURE 4.

In the drawings there is shown an apparatus for setting out the shuttering for the columns of a building in which which a floor 10 has been cast across a number of vertical supporting columns, one of which is shown at 11. The reinforcing rods 12 of the column 11 extend through the floor 10 and the shuttering for the next upper column is accurately positioned by the present apparatus which comprises basically a radio-active substance below the floor 10 and a detection apparatus above the floor.

The holding means for the radio-active substance is shown in FIGURES 1 to 3 and comprises an elongated member 13 about six to eight feet long of tubular steel construction. The elongated member 13 is bifurcated at its lower end to form a pair of handles 14 and is formed at its upper end with a cranked portion 15 supporting the radio-active substance. The cranked portion 15 is formed with a horizontal plate 16 having a peripheral lip or flange 17 for retaining therein a tubular aluminium or brass container 18 in which is located a gamma ray source in the form of a radio-active isotope in the usual lead container. The radio-active isotope may be a caesium, nickel, cobalt or carbon isotope. The container 18 is held in position in the flanged plate 16 by a pair of arms 19 shown in more detail in FIGURE 3 and mounted on the top of the cranked portion 15 of the device. One of the arms 19 is fixed while the other arm (the left hand arm in FIGURE 3) is pivotally mounted for releasing the container 18. The pivoted arm 19 is normally urged by a spring 20 into holding engagement with the container but is moved against the action of the spring 20 by a device which includes a Bowden cable 21 and a manual control 22.

The elongated member 13 is formed intermediate its ends with two pairs of positioning members 23. Each pair of positioning members 23 comprises arms at right angles to each other for engaging the adjacent side of the column 11 so as to position the container 18 at a corner of the column.

In use the member 13 is placed against the column 11 and moved up the column until the container 18 is located against the lower surface of the floor 10.

The detection apparatus is shown in FIGURES 4 to 6 and comprises briefly a scintillation counter 24 of any known construction provided with a visual indicator and, if desired, an aural indicator 25. The detection apparatus includes a probe 26 for receiving the gamma rays emitted from the isotope in the container 18 below the floor 10 (see FIGURE 4).

The probe 26 is located in a plate 27 slidably mounted in an open rectangular frame 28, the plate 27 being formed with a pair of lugs 29 which engage in slots 30 in the side walls of the frame. Each lug 29 is bent downwardly at its outer end to approximately engage the surface of the floor 10 (see FIGURE 5) and is formed with a V-shaped notch 31.

In use, the frame 28 is positioned approximately above the isotope and the slide 27 is then moved until the maximum or peak value is received by the scintillation counter 24. The points in the notches 31 are marked and after the frame 28 has been removed, the points are connected to give a line which when extended will pass through a position on the floor approximately above the isotope. The procedure is repeated twice with the frame 28 at angles of approximately 60° and 120° to the original position. The three extended lines obtained intersect to form a triangle, the centre point of which indicates the corner position of the shuttering.

The scintillation counter may include means for adjusting the detection apparatus in accordance with the thickness of the floor and in practice such an adjustment is advisable in view of the tendency of the gamma rays to spread.

Although the invention has been particularly described in connection with concrete building structures it will, of course, be appreciated that it is equally applicable to the penetration of other materials, with a view to providing an accurate setting up or alignment of parts or building structures.

I claim:

1. Apparatus for locating a column in position above the next lower column of a multi-storied building, which apparatus comprises an elongated member having means at one end thereof for releasably holding a radio-active substance, a handle at the other end thereof for positioning the elongated member to locate the radio-active substance against said next lower column directly beneath the floor above said next lower column, means intermediate said ends of said elongated member for engaging the surface of said column, and a detection apparatus adapted to be positioned on the floor above said next lower column, said detection apparatus comprising an elongated frame having a probe slidably mounted thereon and movable longitudinally of said frame, and marking means straddling said probe and movable therewith.

2. Apparatus as claimed in claim 1, wherein the holding means for the radio-active substance is operable to release said radio-active substance by remote control means located intermediate the ends of said elongated member.

References Cited in the file of this patent

UNITED STATES PATENTS

| | | |
|---|---|---|
| 1,180,764 | Derdits | Apr. 25, 1916 |
| 2,285,440 | Kaiser | June 9, 1942 |
| 2,425,512 | Crumrine | Aug. 12, 1947 |
| 2,425,533 | Herzog | Aug. 12, 1947 |
| 2,486,845 | Herzog | Nov. 1, 1949 |
| 2,803,484 | Puckett | Aug. 20, 1957 |

FOREIGN PATENTS

| | | |
|---|---|---|
| 825,781 | France | Dec. 16, 1937 |